United States Patent [19]

Zlaikha

[11] 4,089,428
[45] May 16, 1978

[54] WORKPIECE HOLDER AND FEEDER DEVICE FOR BAND SAWS AND OTHER MACHINES

[76] Inventor: Eliyahu Zlaikha, Raziel Street 39, Natanya, Israel

[21] Appl. No.: 729,151

[22] Filed: Oct. 4, 1976

[30] Foreign Application Priority Data

Oct. 3, 1975 Israel .................................. 48232

[51] Int. Cl.² ............................................. B23Q 5/24
[52] U.S. Cl. ................................. 214/1.5; 83/435.1; 83/474
[58] Field of Search .................. 214/1.5, 1.6, 1 F; 83/435.1, 474, 477.2

[56] References Cited

U.S. PATENT DOCUMENTS

| 1,347,536 | 7/1920 | Downie | 214/1.6 |
| 1,886,321 | 11/1932 | Walker | 83/435.1 |
| 2,363,745 | 11/1944 | Petersen | 214/1.5 |

FOREIGN PATENT DOCUMENTS

| 1,801,528 | 12/1969 | Germany | 214/1.5 |

*Primary Examiner*—Drayton E. Hoffman
*Assistant Examiner*—George F. Abraham
*Attorney, Agent, or Firm*—Benjamin J. Barish

[57] ABSTRACT

A workpiece holder and feeder mountable on a rectangular base of a machine tool, comprises a pair of parallel cross-bars engagable with two opposed sides of the base, and a pair of angle bars fixed at the opposite ends of each cross-bar, each angle bar having a leg fixed to the respective cross-bar, and another leg engagable with the remaining two opposed sides of the base. A pair of parallel guide bars are fixed to the cross-bars parallel to the latter leg of the angle bars. The holder further includes a table for supporting the workpiece and slidable on the base between the guide bars towards the machine tool, a cable having one end fixed to one of the bars, a weight suspended from the opposite end of the cable, and a plurality of rollers engaging an intermediate portion of the cable such that the weight applies a continuous and uniform feeding force, as the weight lowers, to feed the table and the workpiece carried thereon towards the machine tool.

6 Claims, 1 Drawing Figure

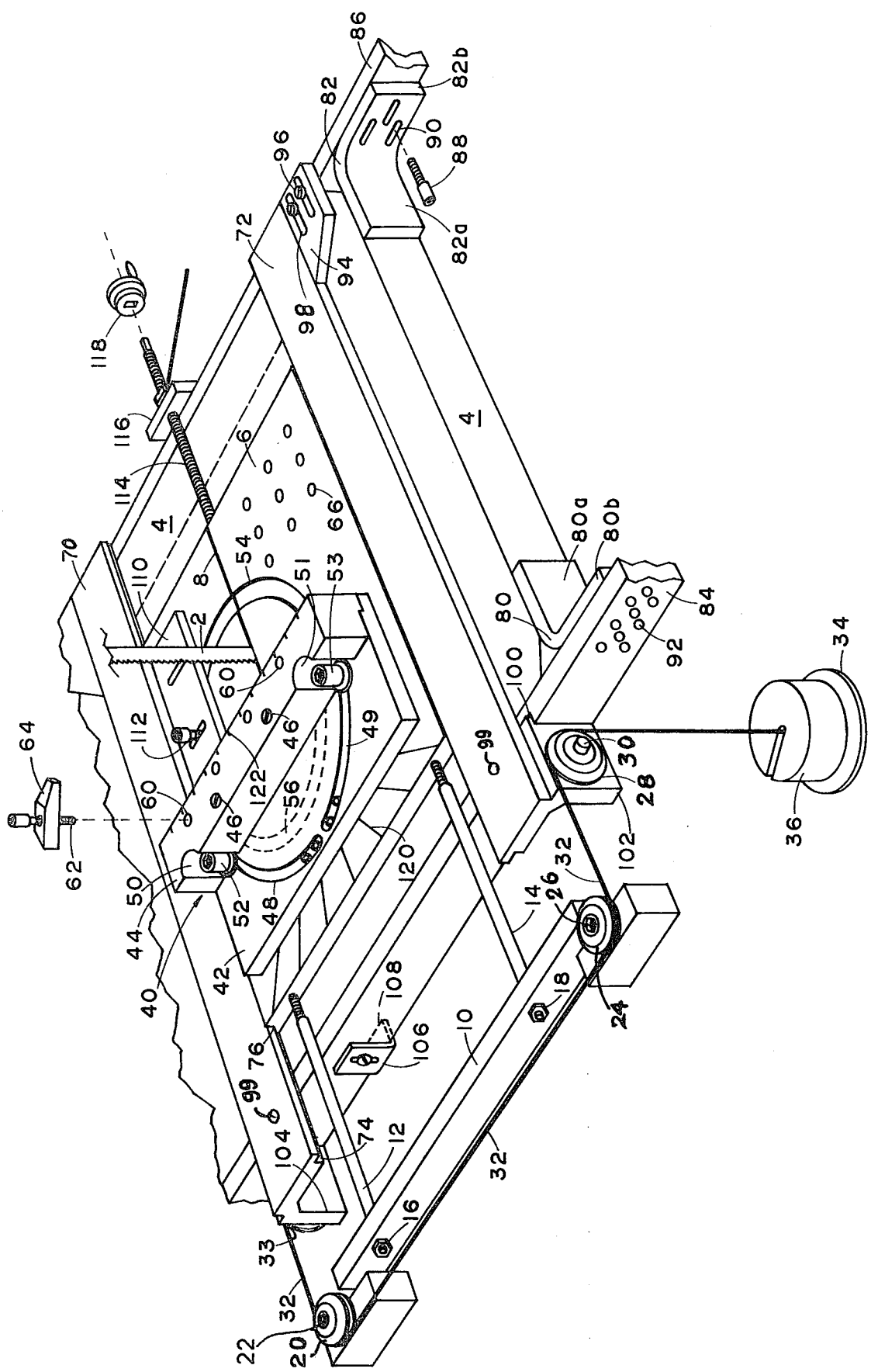

WORKPIECE HOLDER AND FEEDER DEVICE FOR BAND SAWS AND OTHER MACHINES

BACKGROUND OF THE INVENTION

The present invention relates to a workpiece holder and feeder device for machine tools, particularly band saws.

Most band saws involve manual feeding of the workpiece, which is a time-consuming, arduous, and relatively inexact procedure because of the difficulty in applying a continuous and uniform force for advancing the workpiece with respect to the band saw. Various types of automatic feeders are available for band saws and other machine tools, involving pneumatic, hydraulic or electrical feeding of the workpiece, but such devices are relatively complicated and therefore expensive. Moreover, both the manual and automatic feeding devices are generally not entirely satisfactory with respect to sawing rods along their length, internal and external angles, and other special shapes.

SUMMARY OF THE INVENTION

According to a broad aspect of the present invention, there is provided a workpiece holder and feeder mountable on a rectangular base of a machine tool, comprising a pair of parallel cross-bars engageable with two opposed sides of the base, and a pair of angle bars fixed at the opposite ends of each cross-bar. Each angle bar has a first leg fixed to the respective cross-bar, and a second leg engageable with the remaining two opposed sides of the base. A pair of parallel guide bars are fixed to the cross-bars parallel to the second leg of the angle bars. The holder further includes a table for supporting the workpiece and slidable on the base between the guide bars towards the machine tool; a cable having one end fixed to one of said bars; weight suspended from the opposite end of the cable; and a plurality of rollers engaging an intermediate portion of the cable. At least one of the rollers is fixed to the slidable table and another is fixed to one of said bars such that the weight applies a continuous and uniform feeding force, as the weight lowers, to feed the table and the workpiece carried thereon towards the machine tool.

According to a further aspect, the plurality of rollers include a horizontal roller mounted at each corner of the slidable table at one end thereof opposite to the machine tool, and a pair of vertical rollers fixed to one of said bars.

It will thus be seen that the foregoing aspects of the invention provide a simple and inexpensive arrangement for mounting the workpiece holder and feeder to machine tool bases and for applying a continuous and uniform force to automatically feed the workpiece, which feeding force can be conveniently varied for different workpieces or rates of cutting by simply applying the appropriate weights.

According to further aspects of the invention, the slidable table includes a pusher-block for engaging the workpiece and for advancing same towards the machine tool. The workpiece pusher block is angularly adjustable on the slidable table and includes an arcuate slot and a locking bolt slidable therethrough for locking same to the slidable table in any adjusted angular position with respect to the machine tool. In the described embodiment, this block includes a plurality of sections which are individually removable from the slidable table to adapt the device for feeding different thickness workpieces. Further, this block may include a clamp for clamping the workpiece thereto.

These and other features of the invention, to be described below, provide a simple, efficient and flexible arrangement for supporting the workpiece enabling its use for cutting rods along their length, internal and external angles, flat sheets, round discs, and other shaped forms, with precision and fine finish — according to the quality of the saw.

BRIEF DESCRIPTION OF THE DRAWING

The invention is herein described, by way of example only, with reference to the accompanying drawing illustrating a preferred embodiment of the invention in the form of a workpiece holder and feeder for band saws.

DESCRIPTION OF THE PREFERRED EMBODIMENT

The band saw illustrated in the accompanying drawing includes a vertical saw blade 2 and a fixed rectangular base 4 for supporting the workpiece. Any conventional band saw may be used, and therefore further details of its structure are not illustrated.

A table 6 is slidably disposed on fixed base 4 of the band saw. Table 6 is adapted to support a workpiece which is fed towards the band saw 2 (i.e. rightwardly in the drawings) during the sawing operation. For this purpose, the front (right, in the drawing) side of slidable table 6 includes a slit 8 for accommodating the saw blade 2 as the table feeds the workpiece thereto.

The rear (i.e. left in the drawing) end of the slidable table 6 includes a cross-bar 10 fastened to and spaced from table 6 by means of a pair of threaded rods 12, 14, threaded at one end into the slidable table, and at their opposite ends into the cross bar 10, the latter ends receiving nuts 16, 18. A horizontal roller 20 is rotatably mounted on a vertical pin 22 at one end of cross-bar 10, and another horizontal roller 24 is mounted on a vertical pin 26 at the opposite end of the cross-bar. A third roller 28, this being a vertical roller, is mounted on a horizontal pin 30 fixed to the base 4 of the band saw. A cable 32 is fixed at one end 33 with respect to base 4, and is passed first around horizontal roller 20 at one end of the slidable table cross-bar 10, then around the other horizontal roller 24 at the other end of the cross-bar, and finally around the vertical roller 30 fixed to the base. The opposite end of the cable carries a holder 34 for receiving a removable weight 36.

Mounted on slidable table 6 is a pusher-block, generally designated 40, for engaging the workpiece and for advancing same towards the saw blade 2. Pusher-block 40 includes two sections, namely a relatively wide and thin plate section 42, and a relatively narrow and thick bar section 44, the two sections being secured together by removable fasteners 46. The plate section 42 is formed with a pair of through-going arcuate slots 48, 49 aligned at their extreme ends with semicircular bores 50, 51 formed through the bar section 44. Each arcuate slot 48, 49 and semi-circular bore 50, 51 receives a threaded fastener 52, 53 passing through same and into a threaded bore formed in the underlying portion of the slidable table 6. The slidable table is further formed with a circular recess 54 receiving a semi-circular rib (shown in broken lines 56) formed on the underface of the plate section 42 of pusher-block 40.

The foregoing arrangement enables pusher-block 40, including both its sections 42, 44, to be angularly adjusted with respect to saw blade 2, by means of the tightening bolts 52, 53. Thus, if the pusher-block is to be angularly adjusted clockwise on slidable table 6, the right fastener 53 is removed from the right end of its slot 49 and is passed through a bore in the slidable table 6 at the left end of its slot 49; the other fastener 52 is loosened; the complete pusher-block is rotated clockwise to the required angular position; and then the two fasteners 52, 53 are tightened to fix the pusher-block in that angular position. If the pusher-block is to be angularly adjusted counter-clockwise, the left fastener 52 is removed and is reinserted into the opposite (right) end of its slot 48; the right fastener 53 is loosened; the pusher-block is rotated counter-clockwise, and then the two fasteners are tightened. The foregoing structure thus provides a simple arrangement for angularly adjusting pusher-block 40, and thereby the workpiece engaged by the pusher-block with respect to saw blade 2.

Bar section 44 of pusher block 40 is provided with a plurality of threaded bores 60 each adapted to receive a threaded fastener 62 of a clamping bar 64 for clamping the workpiece to the pusher-block. In addition, the bar section 44 of the pusher-block may be removed by removing fasteners 46, in order to accommodate thinner workpieces. The plate section 42 of the pusher-block may also be removed, by removing fasteners 52, 53, in which case the workpiece may be clamped directly to the slidable table 6 by means of threaded fastener 62 and clamping bar 64, the fasteners being threadedly received within further threaded bores 66 formed in various positions in the slidable table 6 to enable the workpiece to be clamped in any desired position thereon.

The movement of slidable table 6 is guided by a pair of guide bars 70, 72 mounted on base 4. Each guide bar is formed with an inner grooved edge 74 engagable with a complementary grooved edge 76 on the slidable table. The guide bars 70, 72 are mounted to the base 4 by means of a pair of cross-bars 84, 86 engagable with two opposed sides of the base, and a pair of angle bars 80, 82 fixed to each cross-bar and including lags 80a, 82a engageable with the remaining two opposed sides of the base.

In the arrangement illustrated in the drawing, each of the guide bars 70, 72 is adjustably mounted to the base to enable it to be used with different size bases. The drawing illustrates the adjustable mounting only for guide bar 72, it being appreciated that a similar adjustable mounting is provided for guide bar 70.

Thus, the second legs 80b, 82b of the angle bars 80, 82 are fixed to the cross-bars 84, 86 by means of fasteners 88 passing through openings 90 in the angle bars and openings 92 in the cross-bars. One end of guide bar 72 has secured thereto, as by welding, a mounting plate 94 having fasteners 96 passing through openings 98 therein and threaded into cross-bar 86. Thus, one end of guide bar 72 is fixed to cross-bar 86 by mounting plate 94, and cross-bar 86 is fixed to one leg 82b of angle bar 82, the other leg 82a of the angle bar merely engaging the side of base 4. The other end of guide bar 72 is fixed to the other cross-bar 84 by merely a threaded fastener 99, which is preferably counter-sunk to provide a flat surface, cross-bar 84 being secured to leg 80b of angle bar 80, the other leg 80a also merely engaging the side of base 4.

Cross bar 84 is preferably formed with a recess 100 at each end of a width to receive the mounting plate 102 of vertical pulley 28 in one recess, and a similar mounting plate 104 in the other recess, the latter mounting plate carrying a pin (not shown) for fixing the end 33 of cable 32 which may be looped and attached thereto. The two mounting plates 102, 104 are fixed, as by welding, to the respective guide bars 72, 74, thereby bracing the guide bars and enabling them, with the slidable table 6, to be mounted on a base 4 without the need to pass fasteners through the base. Preferably, an angle plate 106 is fixed to cross bar 84, with one leg 108 of the plate engaging the under surface of base 4 to further brace the unit against a tendency to move upwardly.

It will thus be seen that weight 36 applies a continuous and uniform feeding force, as the weight lowers, to feed the slidable table 6 and the workpiece supported thereon, towards the saw blade 2. In the arrangement illustrated, the weight on holder 34 is multiplied by two when it is applied to the slidable table 6, since the displacement of the table is one-half the displacement of the weight as it lowers by gravity. Thus, a 5 Kgm. weight will produce a 10 Kgm. feed force. It will be appreciated that the feeding force can be varied as desired for any particular workpiece material or cutting speed by merely selecting the appropriate weight applied to the holder.

In order to permit adjustment of the mounting of guide bar 72 to accommodate different size bases, the openings 98 in the mounting plate 94 receiving the fasteners 96 are elongated in the direction longitudinally of the guide bar. In addition, the openings 90 in the angle bars 80, 82 are elongated in the direction transversely of the guide bar to permit adjustment in the transverse direction, fasteners 88 being passed through a selected one of the plurality of openings 92 in the cross-bars 84, 86.

The device illustrated in the drawing further includes a spacer bar 110 removably attached to the slidable table 6 by means of a threaded fastener 112 receivable in one of the threaded openings 66. A spacer bar could also be applied at the opposite edge of the slidable table.

The device illustrated further includes an adjustable stop engageable with the slidable table 6 for fixing the feeding limit thereof with respect to the saw blade 2. The adjustable stop illustrated in the drawings is in the form of a threaded rod 114 threaded through a plate 116 fixed to cross-bar 86 and terminating at its outer end in a head 118 which may be used for rotating the rod in order to vary the position of its inner end. The latter end is aligned with the end of slidable table 6 so as to limit the feeding movement thereof as determined by the position of the stop.

Further illustrated in the drawing are scale markings 120 on one edge of the slidable table 6 indicating angles and scale markings 122 on bar section 44 of the pusher block 40 indicating length.

What is claimed is:

1. A workpiece holder and feeder mountable on a rectangular base of a machine tool, comprising: a pair of parallel cross-bars engageable with two opposed sides of the base; a plurality of angle bars, one angle bar fixed at each end of each cross-bar; each angle bar having a first leg fixed to the respective cross-bar, and a second leg engageable with the adjacent one of the remaining two opposed sides of the base; a pair of parallel guide bars fixed to the cross-bars parallel to said second leg of the angle bars; the guide bars and the angle bars all being fixed to the cross-bars by adjustable fastener means enabling their adjustment with respect to the cross-bars to permit mounting the holder and feeder on different size bases; a table for supporting the workpiece and slidable on the base between said guide bars towards a work performing position; a cable having one end fixed to one of said bars; a weight suspended from the opposite end of the cable; and a plurality of rollers engageing an intermediate portion of the cable, at least one of the rollers being fixed to the slidable table and another being fixed to one of said bars such that the weight applies a continuous and uniform feeding force, as the weight lowers, to feed the table and the workpiece carried thereon towards the work performing position.

2. A device according to claim 1, wherein the plurality of rollers include a horizontal roller mounted at each corner of the slidable table at one end thereof opposite to the machine tool, and a vertical roller fixed to one of said bars.

3. A device according to claim 2, wherein the slidable table includes a horizontal plate for supporting the workpiece, and a further cross-bar adjustably secured across one end of the horizontal plate by means of a pair of rods, the horizontal rollers being mounted at opposite ends of the cross-bar.

4. A device according to claim 1, wherein the slidable table includes a pusher-block for engaging the workpiece and for advancing same towards the work performing position, said pusher-block being angularly adjustable on the slidable table and including an arcuate slot and a locking bolt slidable therethrough for locking same to the slidable table in any adjusted angular position with respect to the machine tool.

5. A device according to claim 1, further including an adjustable stop carried by one of said cross-bars and engagable with the slidable table for fixing the feeding limit thereof with respect to the machine tool.

6. A device according to claim 4, wherein the workpiece pusher-block includes a plurality of sections mounted on top of each other which sections are individually removable from the slidable table to adapt the device for feeding different thickness workpieces, and a clamp for clamping the workpiece thereto.

* * * * *